(12) United States Patent
Boardman

(10) Patent No.: US 12,416,258 B2
(45) Date of Patent: Sep. 16, 2025

(54) ASYMMETRIC INTRODUCTION OF STEAM INTO TURBINE ENGINE COMBUSTION CHAMBER

(71) Applicant: Raytheon Technologies Corporation, Farmington, CT (US)

(72) Inventor: Gregory Boardman, Owens Cross Roads, AL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/120,835

(22) Filed: Mar. 13, 2023

(65) Prior Publication Data
US 2024/0309807 A1 Sep. 19, 2024

(51) Int. Cl.
*F02C 3/30* (2006.01)

(52) U.S. Cl.
CPC ............ *F02C 3/30* (2013.01); *F05D 2220/32* (2013.01); *F05D 2240/35* (2013.01); *F05D 2270/08* (2013.01)

(58) Field of Classification Search
CPC .............. F02C 3/30; F02C 3/305; F02C 3/22
See application file for complete search history.

(56) References Cited

U.S. PATENT DOCUMENTS

| | | | | |
|---|---|---|---|---|
| 3,763,650 A | * | 10/1973 | Hussey | F23R 3/28 60/737 |
| 5,784,875 A | * | 7/1998 | Statler | F23R 3/12 60/39.463 |
| 6,430,930 B1 | | 8/2002 | Andersson | |
| 8,631,656 B2 | | 1/2014 | Danis | |
| 10,415,832 B2 | * | 9/2019 | Lee | F23R 3/14 |
| 10,570,820 B2 | * | 2/2020 | Tamura | F23R 3/28 |
| 2005/0034463 A1 | * | 2/2005 | Simpson | F02C 3/30 60/39.53 |
| 2007/0001026 A1 | * | 1/2007 | Lecheler | F02C 3/30 239/69 |
| 2007/0089425 A1 | * | 4/2007 | Motter | F23L 7/002 60/39.3 |
| 2009/0241548 A1 | | 10/2009 | Danis | |
| 2011/0048022 A1 | | 3/2011 | Singh | |
| 2011/0185699 A1 | * | 8/2011 | Danis | F23R 3/50 60/39.55 |
| 2011/0300491 A1 | | 12/2011 | Wasif | |
| 2013/0097991 A1 | * | 4/2013 | Zhang | F23K 5/12 60/39.59 |

(Continued)

FOREIGN PATENT DOCUMENTS

| | | |
|---|---|---|
| EP | 0643267 B1 | 7/1999 |
| WO | 0034715 W | 6/2000 |

OTHER PUBLICATIONS

EP Search Report for EP Patent Application No. 24151947.9 dated Jun. 5, 2024.

*Primary Examiner* — Gerald L Sung
*Assistant Examiner* — Jacek Lisowski
(74) *Attorney, Agent, or Firm* — Getz Balich LLC

(57) ABSTRACT

A method is provided for operating a turbine engine. During this method, fuel is injected into a combustion chamber of a combustor of the turbine engine. The combustion chamber extends circumferentially around a centerline. The fuel is combusted within the combustion chamber. Steam is introduced into the combustion chamber in an asymmetric pattern around the centerline.

12 Claims, 9 Drawing Sheets

(56) References Cited

U.S. PATENT DOCUMENTS

| | | |
|---|---|---|
| 2014/0083111 A1 | 3/2014 | Gregg |
| 2016/0273449 A1* | 9/2016 | DiCintio ................. F23D 11/16 |
| 2017/0022898 A1* | 1/2017 | Beadie .................... F02C 7/222 |
| 2017/0058769 A1* | 3/2017 | Vandale .................... F02C 3/30 |
| 2017/0067639 A1* | 3/2017 | Zong ........................ F23R 3/50 |
| 2022/0333783 A1 | 10/2022 | Toqan |

* cited by examiner

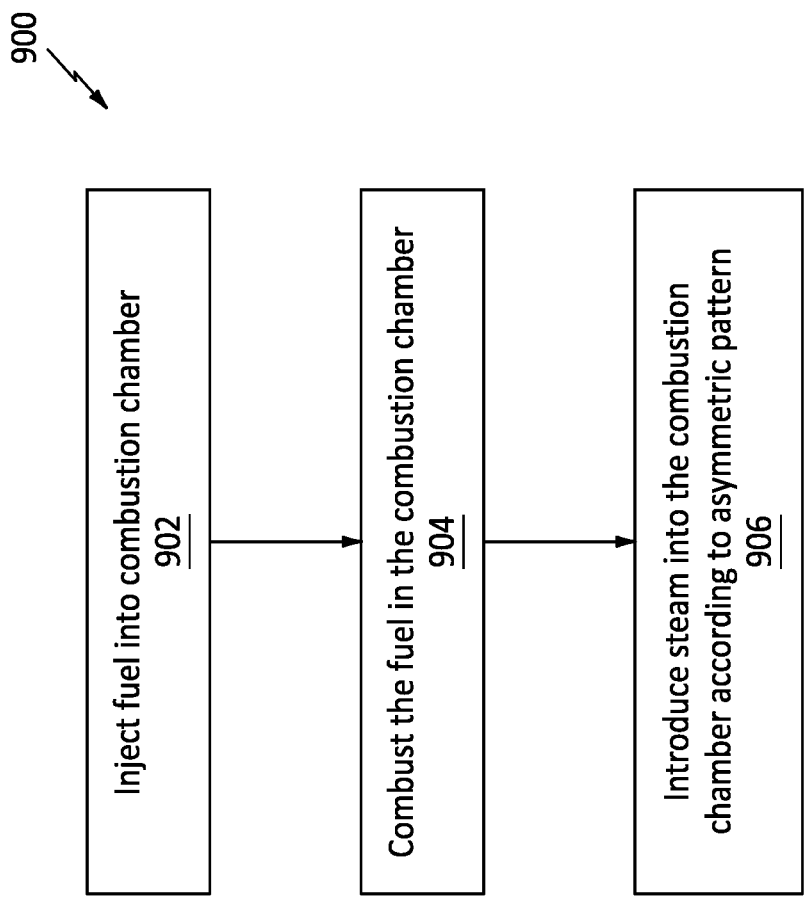

ASYMMETRIC INTRODUCTION OF STEAM INTO TURBINE ENGINE COMBUSTION CHAMBER

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, a method is provided for operating a turbine engine. During this method, fuel is injected into a combustion chamber of a combustor of the turbine engine. The combustion chamber extends circumferentially around a centerline. The fuel is combusted within the combustion chamber. Steam is introduced into the combustion chamber in an asymmetric pattern around the centerline.

According to another aspect of the present disclosure, an assembly is provided for a turbine engine. This assembly includes a combustor, a fuel system and a steam system. The combustor includes a combustion chamber and a centerline. The combustion chamber extends circumferentially around the centerline. The fuel system is configured to inject fuel into the combustion chamber for combustion. The steam system is configured to introduce steam into the combustion chamber in an asymmetric pattern around the centerline.

According to still another aspect of the present disclosure, another assembly is provided for a turbine engine. This assembly includes a combustor, a fuel system and a steam system. The combustor includes a combustion chamber and a centerline. The combustion chamber extends circumferentially around the centerline. The fuel system is configured to inject fuel into the combustion chamber for combustion. The steam system is configured to introduce steam into the combustion chamber through at least a plurality of first orifices and a plurality of second orifices. The first orifices and the second orifices are arranged in a non-repeating pattern circumferentially around the centerline. The steam system is configured to introduce the steam into the combustion chamber through each of the first orifices at a first flowrate. The steam system is configured to introduce the steam into the combustion chamber through each of the second orifices at a second flowrate that is different than the first flowrate.

The asymmetric pattern may be divided into a first half sector and a second half sector around the centerline. The steam system may be configured to introduce the steam into the combustion chamber in a first pattern about the centerline in the first half sector. The steam system may be configured to introduce the steam into the combustion chamber in a second pattern about the centerline in the second half sector. The second pattern may be different than the first pattern.

The asymmetric pattern may be divided into a first half sector and a second half sector around the centerline. The steam system may be configured to introduce a first quantity of the steam into the combustion chamber in the first half sector. The steam system may be configured to introduce a second quantity of the steam into the combustion chamber in the second half sector. The second quantity of the steam may be different than the first quantity of the steam.

The method may also include attenuating acoustic modes generated by the combustion of the fuel using the steam introduced into the combustion chamber in the asymmetric pattern.

The asymmetric pattern may be divided into N number of sectors around the centerline with equal arc lengths. The N number of sectors may include a first sector and a second sector. The steam may be introduced into the combustion chamber in a first pattern about the centerline in the first sector. The steam may be introduced into the combustion chamber in a second pattern about the centerline in the second sector. The second pattern may be different than the first pattern.

A first quantity of the steam may be introduced into the combustion chamber in the first sector. A second quantity of the steam may be introduced into the combustion chamber in the second sector. The second quantity of the steam may be different than the first quantity of the steam.

The N number may be an even number.

The N number may be an odd number.

The asymmetric pattern may be divided into N number of sectors around the centerline with equal arc lengths. The N number of sectors may include a first sector and a second sector. A first quantity of the steam may be introduced into the combustion chamber in the first sector. A second quantity of the steam may be introduced into the combustion chamber in the second sector. The second quantity of the steam may be different than the first quantity of the steam.

The steam may be introduced into the combustion chamber in the asymmetric pattern at a plurality of steam injection locations. The steam injection locations may be arranged in an array and equally spaced around the centerline.

The steam may be introduced into the combustion chamber in the asymmetric pattern through a plurality of orifices with a common size.

The steam may be introduced into the combustion chamber in the asymmetric pattern through a first orifice and a second orifice with a different size than the first orifice.

The steam may be introduced into the combustion chamber in the asymmetric pattern along at a bulkhead of the combustor.

The steam may be introduced into the combustion chamber through a plurality of fuel injector assemblies. The fuel may be injected into the combustion chamber through the plurality of fuel injector assemblies.

The steam may be introduced into the combustion chamber in the asymmetric pattern along at a wall of the combustor.

The steam may be introduced into the combustion chamber in the asymmetric pattern through a plurality of quench apertures.

The fuel may be injected into the combustion chamber in a symmetric pattern around the centerline.

The method may also include changing the asymmetric pattern based on an operating mode of the turbine engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 9 is a flow diagram of a method for operating a gas turbine engine.

DETAILED DESCRIPTION

Figure 1:
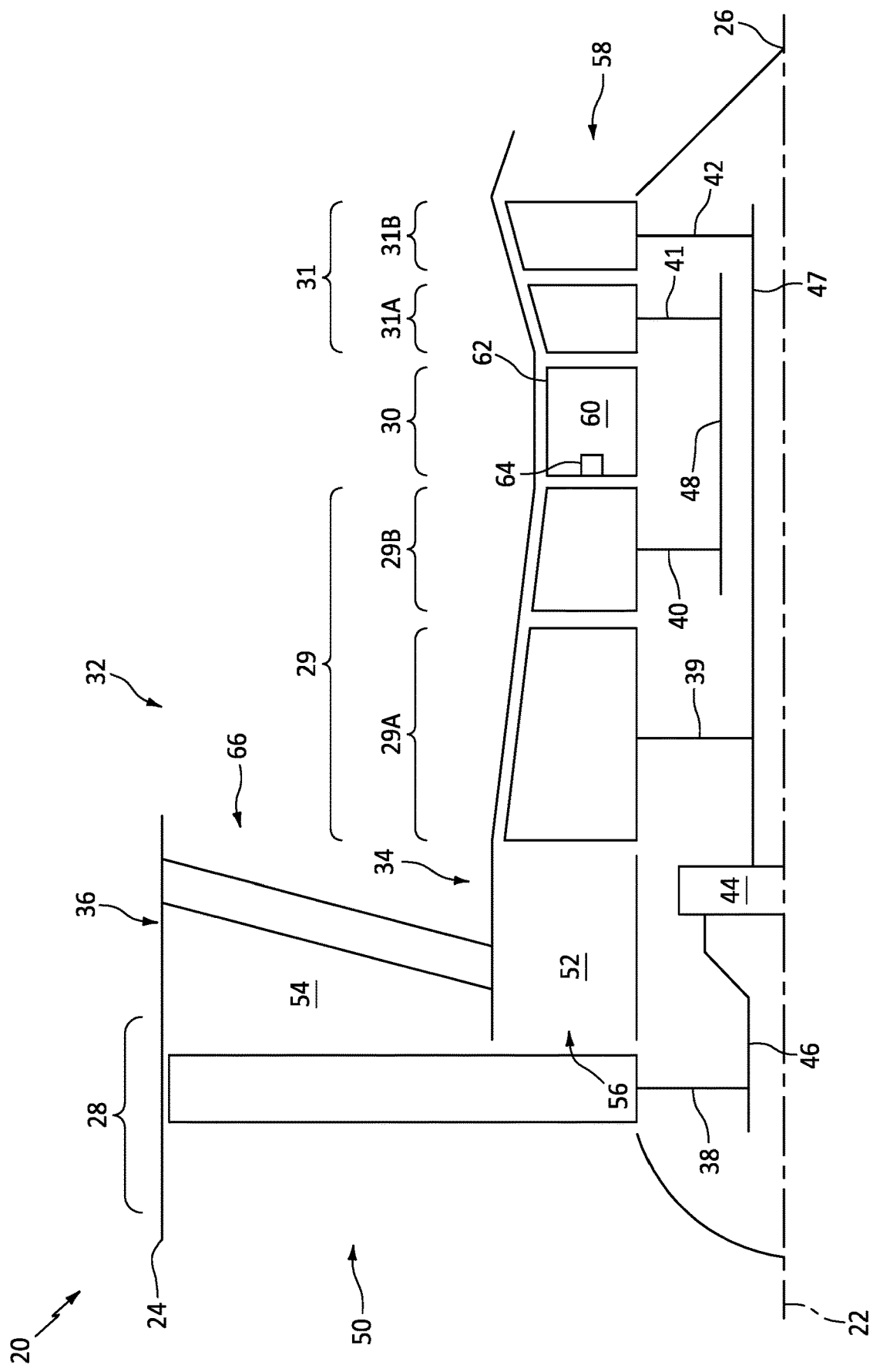
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
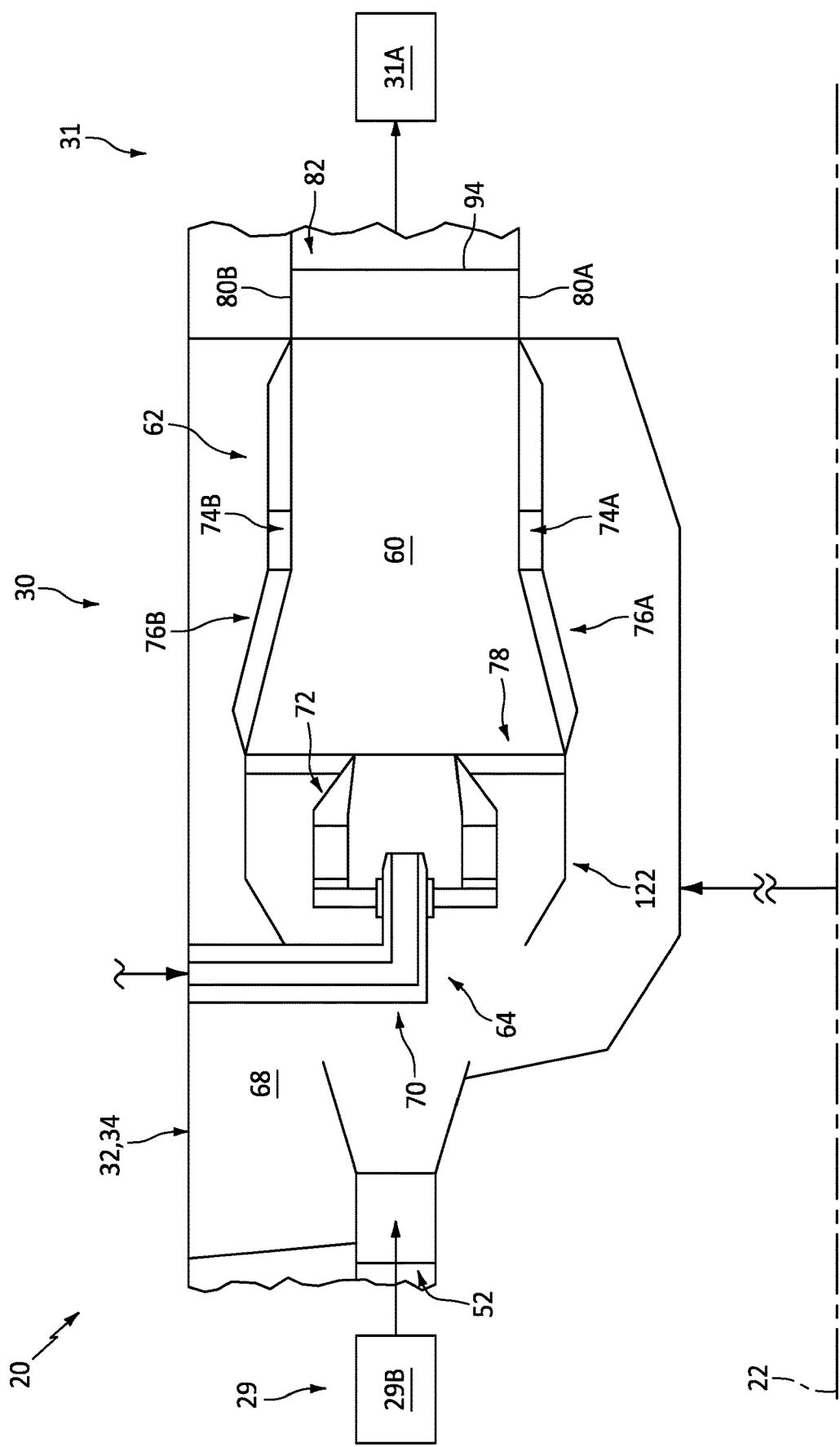
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68. This diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to quench (e.g., stoichiometrically lean) the combustion products; e.g., the ignited fuel-air mixture.

Figure 3:
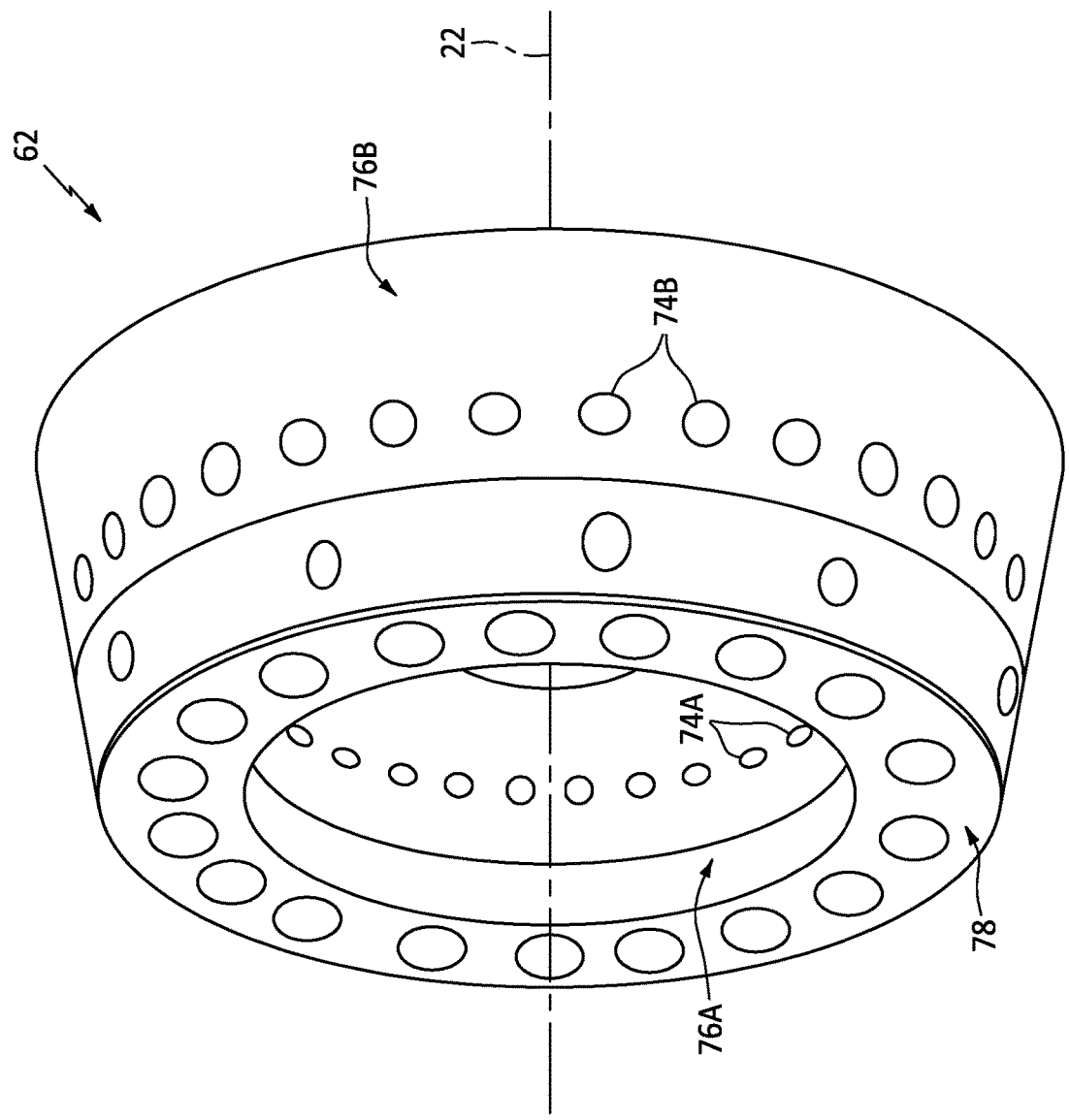
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead 78, the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an inner platform 80A of a downstream stator vane array 82 (e.g., a turbine inlet nozzle) in the HPT section 31A. The outer wall 76B of FIG. 2 projects axially to and may be connected to an outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
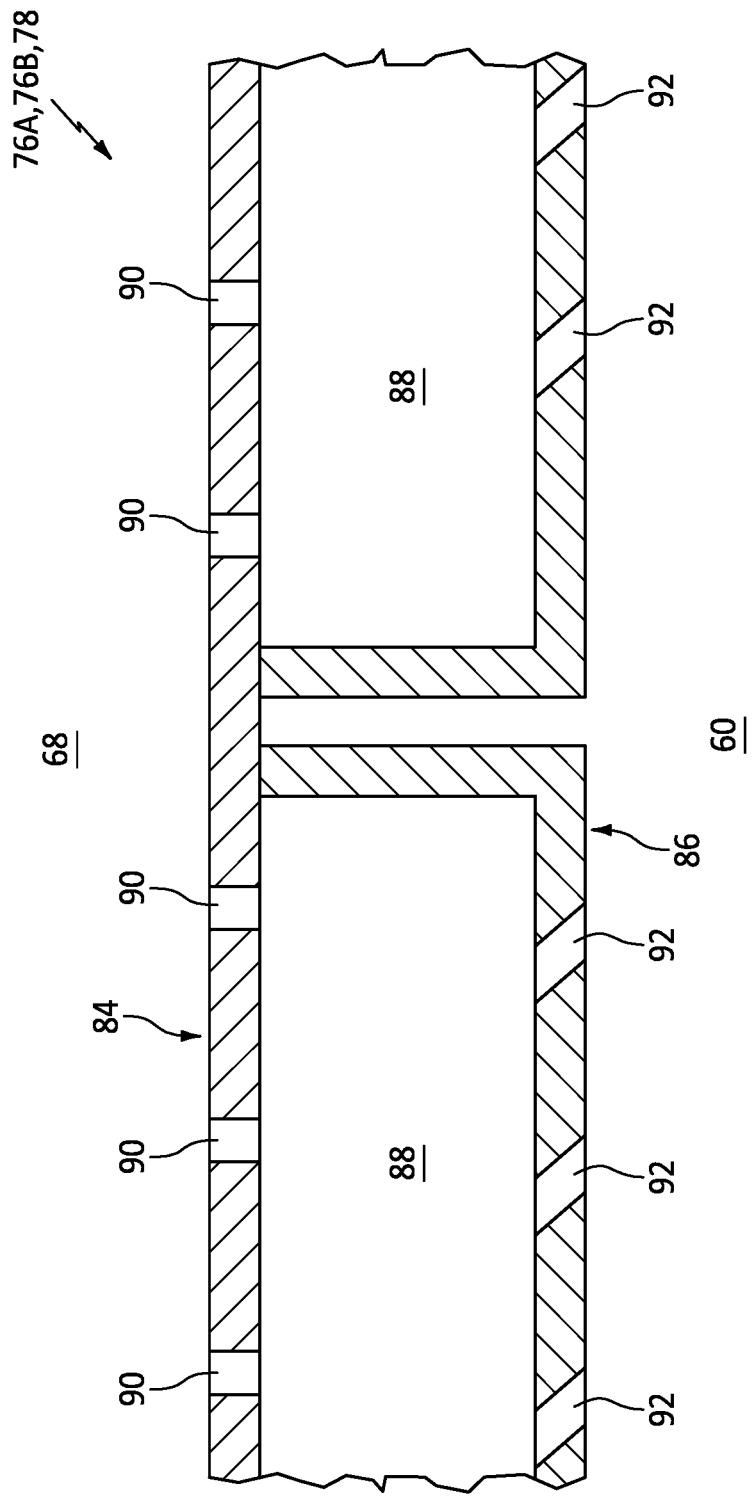
FIG. 4 is a partial sectional illustration of a combustor wall.

Any one or more or all of the walls 76A, 76B, 78 may each be configured as a multi-walled structure; e.g., a hollow, dual-walled structure. For example, referring to FIG. 4, each wall 76A, 76B, 78 includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Referring to FIG. 2, the stator vane array 82 includes the inner platform 80A, the outer platform 80B and a plurality of stator vanes 94 (one visible in FIG. 2); e.g., hollow stator vanes. The stator vanes 94 are arranged circumferentially about the axial centerline 22 in an array; e.g., a circular array. Each of these stator vanes 94 extends radially across the core flowpath 52 between and to the inner platform 80A and the outer platform 80B. Each of the stator vanes 94 may also be connected to the inner platform 80A and/or the outer platform 80B. The stator vane array 82 and its stator vanes 94 are configured to turn and/or otherwise condition the combustion products exiting the combustion chamber 60 for interaction with a first stage of the HPT rotor 41 (see FIG. 1).

Figure 5:
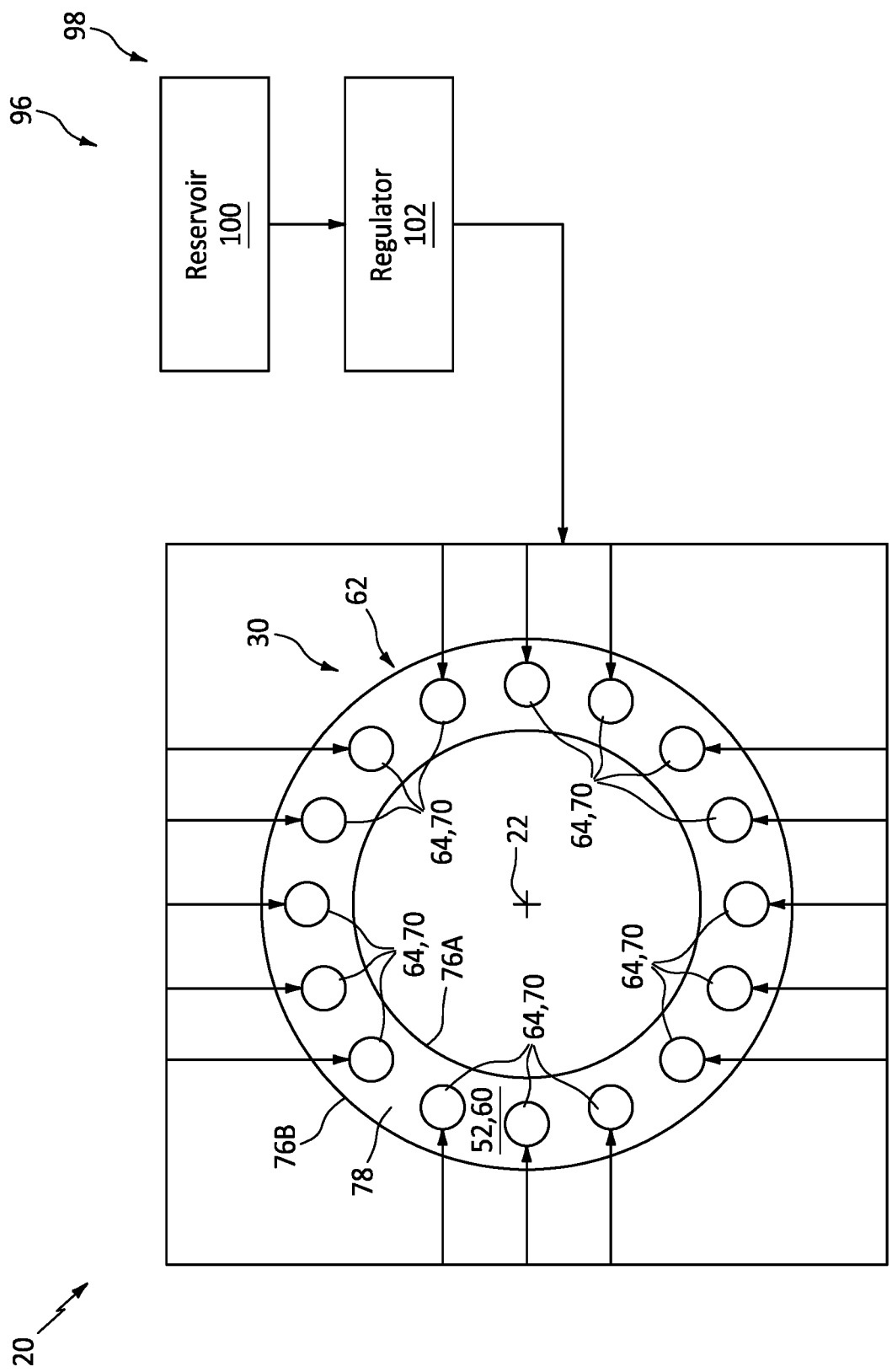
FIG. 5 is a schematic illustration of a fuel system configured with the combustor section.

Referring to FIG. 5, the turbine engine 20 includes a fuel system 96 for delivering the fuel to the combustor 62. This fuel system 96 includes a fuel source 98 and the one or more fuel injectors 70. The fuel source 98 of FIG. 5 includes a fuel reservoir 100 and/or a fuel flow regulator 102; e.g., a valve and/or a pump. The fuel reservoir 100 is configured to store the fuel before, during and/or after turbine engine operation. The fuel reservoir 100, for example, may be configured as or otherwise include a tank, a cylinder, a pressure vessel, a bladder or any other type of fuel storage container. The fuel flow regulator 102 is configured to direct and/or meter a flow of the fuel from the fuel reservoir 100 to one or more or all of the fuel injectors 70. The fuel injectors 70 may be arranged circumferentially about the axial centerline 22 in an array. Each fuel injector 70 is configured to direct the fuel received from the fuel source 98 into the combustion chamber 60 for combustion.

The fuel delivered by the fuel system 96 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 96, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 96 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 96 may be described below as the non-hydrocarbon fuel; e.g., the hydrogen fuel.

Figure 6:
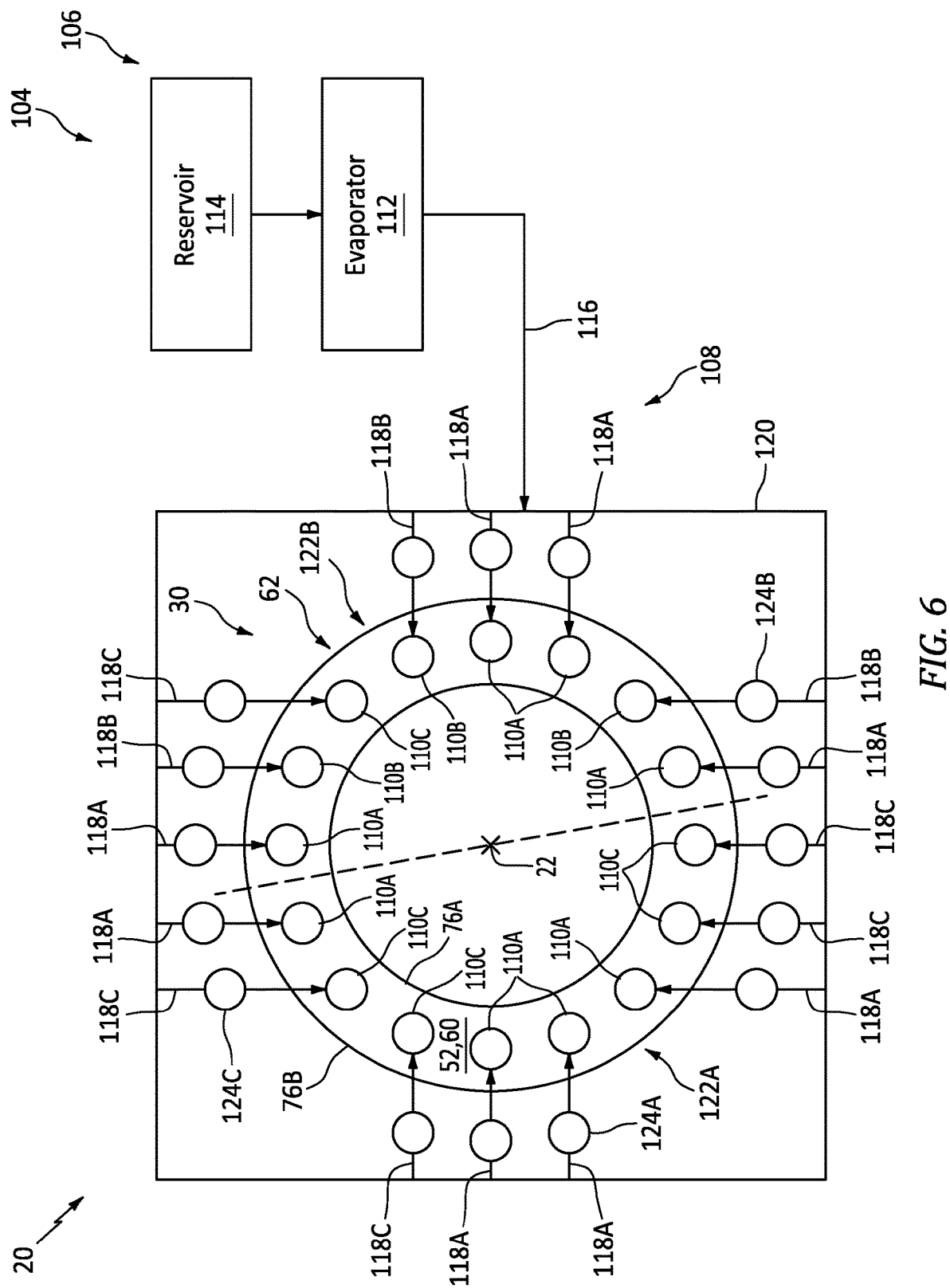
FIG. 6 is a schematic illustration of a steam system configured with the combustor section.

Combustion of the fuel-air mixture within the combustion chamber 60 may generate acoustic modes (e.g., acoustic-heat-release-coupling modes) within the combustion products during various modes (e.g., power settings) of turbine engine operation. These acoustic modes may increase engine noise, increase engine vibrations, create combustion instabilities and/or reduce combustion efficiency. Referring to FIG. 6, to attenuate (e.g., reduce, eliminate, etc.) or otherwise disrupt some or all of these acoustic modes, the turbine engine 20 includes a steam system 104. This steam system 104 is configured to selectively introduce steam into the combustion chamber 60 to interact with the fuel-air mixture and/or the combustion products. The steam system 104 of FIG. 6 includes a steam source 106, a steam delivery circuit 108 and a plurality of steam delivery devices 110A, 110B and 110C (generally referred to as "110").

The steam source 106 is configured to provide the steam to the steam delivery circuit 108 during turbine engine operation and, more particularly, during steam system operation. The steam source 106, for example, may be configured as or otherwise include an evaporator 112, which may be or otherwise include a fluid-to-fluid heat exchanger and/or an electrical heater. The evaporator 112 is configured to evaporate water into the steam during the steam system operation. The water may be received from various sources. The steam source 106 of FIG. 6, for example, includes a water reservoir 114 fluidly coupled with and upstream of the evaporator 112. This water reservoir 114 is configured to store the water before, during and/or after turbine engine operation. Examples of the water reservoir 114 include, but are not limited to, a tank, a cylinder, a pressure vessel, a bladder or any other type of water storage container. Briefly, the water may be supplied to the water reservoir 114 by recovering water vapor from the combustion products flowing through the core flowpath 52 (see FIG. 1) and/or from another water source onboard or offboard an aircraft.

The steam delivery circuit 108 of FIG. 6 includes a supply circuit 116 and a plurality of feed circuits 118A, 118B and 118C (generally referred to as "118"), where each of the feed circuits 118A, 118B, 118C is associated with a respective one of the steam delivery devices 110A, 110B, 110C. The supply circuit 116 of FIG. 6 extends from an outlet from the steam source 106 to an interface 120 with the feed circuits 118 such as a manifold. At this interface 120, the feed circuits 118 may be fluidly coupled in parallel to and downstream of the supply circuit 116. Each of the feed circuits 118 extends from the interface 120 to an inlet of a respective one of the steam delivery devices 110.

Each steam delivery device 110 is configured to introduce (e.g., direct) a portion of the steam directly or indirectly into the combustion chamber 60. Examples of the steam delivery devices 110 include, but are not limited to, nozzles, diffusers, showerheads or any other devices operable to direct (e.g., inject, exhaust and/or otherwise flow) the steam along predetermined trajectories and/or into predetermined spaces. One or more of all of these steam delivery devices 110 may each be configured with (e.g., integrated into) another component of the turbine engine 20. Alternatively, one or more or all of the steam delivery devices 110 may each be configured as a discrete (e.g., standalone) component of the turbine engine 20.

The steam system 104 of FIG. 6 is configured to introduce the steam into the combustion chamber 60 through/using at least or only the steam delivery devices 110 in an asymmetric pattern around the axial centerline 22. For example, the steam system 104 of FIG. 6 is configured to direct the steam at a first flowrate into the combustion chamber 60 through each first steam delivery device 110A. The steam system 104 of FIG. 6 is configured to direct the steam at a second flowrate into the combustion chamber 60 through each second steam delivery device 110B, where the second flowrate is different (e.g., greater) than the first flowrate. The steam system 104 of FIG. 6 is configured to direct the steam at a third flowrate into the combustion chamber 60 through each third steam delivery device 110C, where the third flowrate is different (e.g., greater) than the first flowrate and/or the second flowrate. These steam delivery devices 110A, 110B and 110C are interspersed with one another and arranged in an annular (e.g., circular) array about the axial centerline 22. Within the delivery device array, the steam delivery devices 110 may be arranged in a non-repeating pattern around the axial centerline 22.

The asymmetric pattern of FIG. 6 may be divided into N number of sectors (e.g., 122A and 122B; generally referred to as "122") around the axial centerline 22. Here, the number N is an even number such as, but not limited to, two (2), four (4), six (6), etc. For example, the asymmetric pattern of FIG. 6 is divided into half sectors 122A and 122B. However, the number N may alternatively be an odd number such as, but not limited to, three (3), five (5), seven (7), etc. For example, the asymmetric pattern may be divided into third sectors.

Each of the pattern sectors 122 of FIG. 2 is circumferentially between and may be abutted against (e.g., directly next to) opposing circumferential sides of the other pattern sector 122, or a circumferentially neighboring (e.g., adjacent) pair of the pattern sectors 122 where N is equal to or greater than three (3). The pattern sectors 122 may have common (e.g., the same, equal) arc lengths, where the arc length is measured about the axial centerline 22 between opposing circumferential sides of the respective pattern sector 122. However, one or more or all of the pattern sectors 122 may each have a unique steam flow pattern. For example, the steam is introduced into the combustion chamber 60 in a first pattern about the axial centerline 22 in the first pattern sector 122A. The steam is introduced into the combustion chamber 60 in a second pattern about the axial centerline 22 in the second pattern sector 122B, where the second pattern is different than the first pattern. For example, the arrangement of the steam delivery devices 110 (e.g., a sequence of 110C-110C-110A-110A-110A-110C-110C-110A in a clockwise direction) within the first pattern sector 122A is different than the arrangement of the steam delivery devices 110 (e.g., a sequence of 110A-110B-110C-110B-110A-110A-110B-110A in a clockwise direction) within the second pattern sector 122B. In addition or alternatively, the steam delivery devices 110 within the first pattern sector 122A may be configured to direct a first quantity of the steam into the combustion chamber 60. By contrast, the steam delivery devices 110 within the second pattern sector 122B may be configured to direct a second quantity of the steam into the combustion chamber 60 that is different (e.g., greater or less) than the first quantity of the steam. With such an arrangement, the asymmetric pattern of the steam introduced into the combustion chamber 60 may attenuate or otherwise disrupt some or all of the acoustic modes in the combustion products. Circumferential locations of the steam delivery devices 110 may be equispaced (or not) about the axial centerline 22.

The flow of the steam through the steam delivery devices 110 may be tailored by regulating the flow to the steam delivery devices 110. For example, each feed circuit 118A, 118B, 118C of FIG. 6 is configured with a steam flow regulator 124A, 124B, 124C (generally referred to as "124"), only some of which are labeled in FIG. 6 for ease of illustration. Each steam flow regulator 124 is arranged (e.g., fluidly coupled inline) with a respective one of the steam delivery devices 110. Each steam flow regulator 124 is configured to selectively direct and/or meter a flow of the steam from the steam source 106 to a respective one of the steam delivery devices 110. For example, each steam flow regulator 124 may be configured as or otherwise include a control valve. This control valve may fully open, may fully close and/or may move to one or more partially open positions. While each steam flow regulator 124 is illustrated in FIG. 6 as being part of the respective feed circuit 118, that steam flow regulator 124 may alternatively be arranged at the interface 120 between the supply circuit 116 and the respective feed circuit 118, at the outlet from the respective feed circuit 118, or otherwise. Furthermore, it is contemplated a single steam flow regulator 124A, 124B, 124C may regulate the flow of the steam to like steam delivery devices 110A, 110B, 110C.

Figure 7:
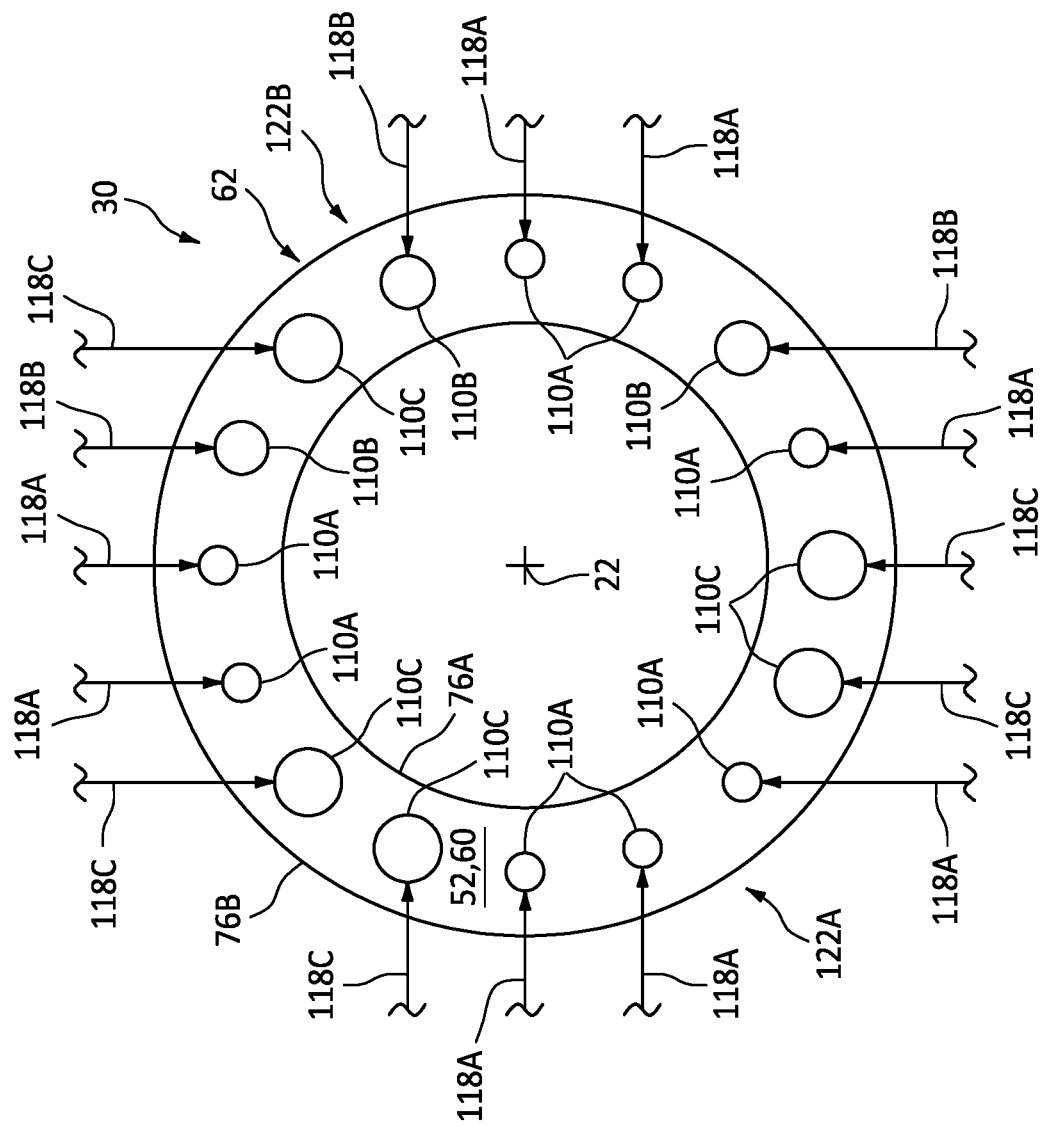
FIG. 7 is a schematic illustration of a portion of the steam system configured with the combustor section, where the steam system has various outlet orifice sizes.

Referring to FIG. 7, the flow of the steam through the steam delivery devices 110 may also or alternatively be tailored by selectively sizing the steam delivery devices 110. For example, a size of an output orifice from each first steam delivery device 110A may be different (e.g., smaller) than a size of an output orifice from each second steam delivery device 110B. Similarly, the size of the output orifice from each second steam delivery device 110B may be different (e.g., smaller) than a size of an output orifice from each third steam delivery device 110C. With such an arrangement, the steam through the steam delivery devices 110 may be tailored without use of multiple steam flow regulators 124. Of course, in other embodiments, some or all of the steam delivery devices 110 may alternatively have a common size.

Figure 8:
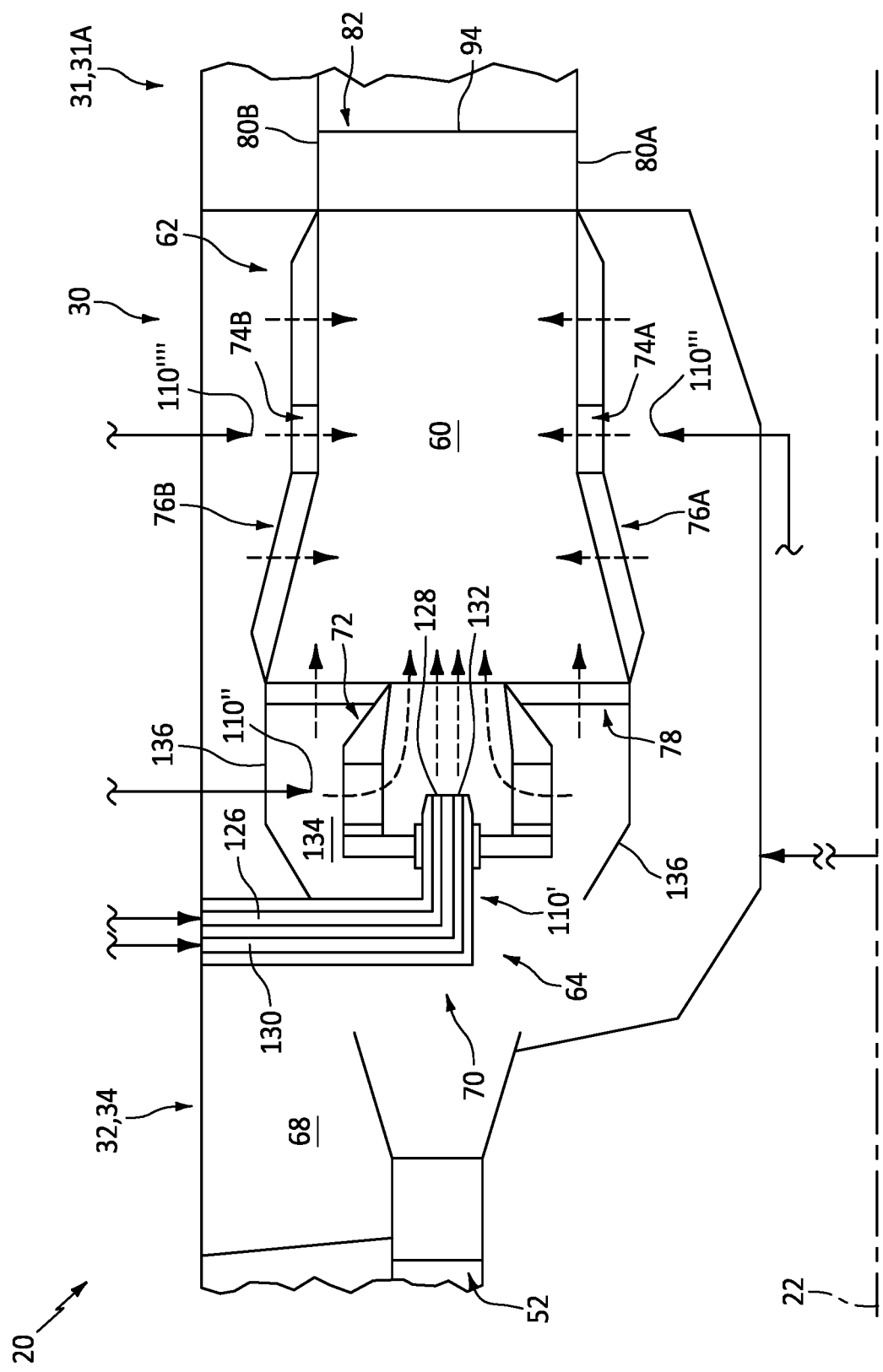
FIG. 8 is a partial schematic illustration of a portion of the gas turbine engine configured with a steam delivery circuit.

In some embodiments, referring to FIG. 8, one or more or all of the steam delivery devices 110 (labeled as "110'" in FIG. 8) may each be configured as part of a respective one of the injector assemblies 64. The steam delivery device 110' of FIG. 8 includes an internal steam passage 126 extending within the fuel injector 70 to at least one steam outlet orifice 128 at a tip of the fuel injector 70. Here, the steam delivery device 110' is configured to direct (e.g., inject) the steam out of the steam outlet orifice 128, through an inner bore of the air swirler structure 72, and into the combustion chamber 60 at the bulkhead 78. The steam delivery device 110' of FIG. 8 may also (or alternatively) include an internal fuel passage 130 extending within the fuel injector 70 to at least one fuel outlet orifice 132 at the injector tip. Here, the injector assembly 64/the steam delivery device 110' is configured to direct a mixture of the fuel and the steam out of the fuel outlet orifice 132, through the swirler bore, and into the combustion chamber 60 at the bulkhead 78.

In some embodiments, one or more or all of the steam delivery devices 110 (labeled as "110''" in FIG. 8) may each be configured to direct the steam into a volume 134 between the bulkhead 78 and a combustor hood 136. This steam may flow into the combustion chamber 60 by flowing across the bulkhead 78 via its cooling apertures and/or cooling cavities. The steam may also or alternatively flow into the combustion chamber 60 by flowing through (e.g., being directed into) the air swirler structures 72.

In some embodiments, one or more or all of the steam delivery devices 110 (labeled as "110''" in FIG. 8) may each be configured to direct the steam into the diffuser plenum 68 adjacent the inner wall 76A. This steam may flow into the combustion chamber 60 by flowing across the inner wall 76A via its cooling apertures and/or cooling cavities. The steam may also or alternatively flow into the combustion chamber 60 by flowing through (e.g., being directed into) the inner quench apertures 74A.

In some embodiments, one or more or all of the steam delivery devices 110 (labeled as "110''''" in FIG. 8) may each be configured to direct the steam into the diffuser plenum 68 adjacent the outer wall 76B. This steam may flow into the combustion chamber 60 by flowing across the outer wall 76B via its cooling apertures and/or cooling cavities. The steam may also or alternatively flow into the combustion chamber 60 by flowing through (e.g., being directed into) the outer quench apertures 74B.

The steam system 104 of FIG. 8 is shown with multiple arrays of the steam delivery devices 110', 110'', 110''', 110''''. Each of these arrays may be configured to introduce the steam into the combustion chamber 60 according to its own asymmetric pattern around the axial centerline 22. These patterns may be the same or different. Furthermore, it is contemplated the any one or more of the multiple arrays may be omitted such that the steam system 104 includes any one, two or three of the arrays shown in FIG. 8.

The asymmetric pattern(s) are described above as being circumferentially extending patterns. It is contemplated, however, that the steam may also be introduced into the combustion chamber 60 in an axially asymmetric (or symmetric) pattern. Furthermore, it is also contemplated the fuel injected by the fuel injectors 70 and/or the quench air injected by the quench apertures 74 may be introduced into the combustion chamber 60 according to a respective asymmetric pattern or a symmetric pattern.

The steam delivery devices 110/arrays of steam delivery devices are described above for use in attenuation of the acoustic mode(s) in the combustion products. However, any one or more or all of these steam delivery devices 110/arrays of steam delivery devices may also (or alternatively in certain modes of operation) be utilized for cooling a respective structure of the turbine engine 20.

FIG. 9 is a flow diagram of a method 900 for operating a gas turbine engine. For ease of description, the operating method 900 is described with respect to the turbine engine 20 of FIG. 1, the fuel system 96 of FIG. 5 and the steam system 104 of FIG. 6. The operating method 900 of the present disclosure, however, is not limited to such an exemplary arrangement.

In step 902, the fuel is injected into the combustion chamber 60 through the injector assemblies 64 and their fuel injectors 70.

In step 904, the fuel is ignited within the combustion chamber 60 such that the fuel-air mixture combusts.

In step 906, the steam is introduced into the combustion chamber 60 in an asymmetric pattern. This asymmetric pattern may be tailored to attenuate the acoustic modes generated by the combustion of the fuel-air mixture within the combustion chamber 60. The asymmetric pattern may also be tailored to cool one or more structures along and/or proximate the combustion chamber 60.

In some embodiments, the asymmetric pattern for introducing the steam into the combustion chamber 60 may remain constant across multiple modes of engine operation; e.g., across multiple engine power settings. However, in other embodiments, the asymmetric pattern for introducing the steam into the combustion chamber 60 may changes across multiple modes of engine operation; e.g., across multiple engine power settings. This may be particularly useful where the acoustic modes also change across the multiple modes of engine operation.

The steam system 104 may be included in various turbine engines other than the one described above. The steam system 104, for example, may be included in a geared turbine engine where a geartrain connects one or more shafts to one or more rotors in a fan section, a compressor section and/or any other engine section. Alternatively, the steam system 104 may be included in a turbine engine configured without a geartrain; e.g., a direct drive turbine engine. The steam system 104 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. A method for operating a turbine engine, comprising:
    injecting fuel into a combustion chamber of a combustor of the turbine engine, the fuel injected into the combustion chamber through a plurality of fuel injector assemblies, wherein the combustion chamber is an annulus that extends circumferentially around a centerline;
    combusting the fuel within the combustion chamber; and
    introducing steam into the combustion chamber in an asymmetric pattern around the centerline using a plu- rality of steam delivery devices, the steam introduced into the combustion chamber through respective tips of the plurality of fuel injector assemblies, wherein the asymmetric pattern is divided into N number of sectors around a circumference of the centerline with equal arc lengths, the N number of sectors includes a first sector and a second sector, the first sector includes a first of the plurality of steam delivery devices, the second sector includes a second of the plurality of steam delivery devices, the steam is introduced into the combustion chamber in a first pattern about the centerline in the first sector, and the steam is introduced into the combustion chamber in a second pattern about the centerline in the second sector, and the second pattern is different than the first pattern;

wherein a first quantity of the steam is introduced into the combustion chamber in the first sector, and a second quantity of the steam is introduced into the combustion chamber in the second sector, and the second quantity of the steam is different than the first quantity of the steam.

2. The method of claim 1, further comprising attenuating acoustic modes generated by the combustion of the fuel using the steam introduced into the combustion chamber in the asymmetric pattern.

3. The method of claim 1, wherein the N number is an even number.

4. The method of claim 1, wherein the N number is an odd number.

5. The method of claim 1, wherein the plurality of steam delivery devices are arranged in an array and equally spaced around the centerline.

6. The method of claim 1, wherein the steam is introduced into the combustion chamber in the asymmetric pattern through a first orifice and a second orifice with a different size than the first orifice.

7. The method of claim 1, wherein the steam is introduced into the combustion chamber in the asymmetric pattern along a bulkhead of the combustor.

8. The method of claim 1, wherein the fuel is injected into the combustion chamber in a symmetric pattern around the centerline.

9. The method of claim 1, further comprising changing the asymmetric pattern based on an operating mode of the turbine engine.

10. An assembly for a turbine engine, comprising:
a combustor comprising a combustion chamber and a centerline, wherein the combustion chamber is an annulus that extends circumferentially around the centerline;
a fuel system configured to inject fuel into the combustion chamber for combustion; and
a steam system configured to introduce steam into the combustion chamber in an asymmetric pattern around the annulus using a plurality of steam delivery devices, the steam system comprising a steam source, a steam delivery circuit, and a plurality of steam delivery devices, wherein the asymmetric pattern is divided into a first half sector and a second half sector around the centerline, the steam system is configured to introduce the steam into the combustion chamber in a first pattern about the centerline in the first half sector, the steam system is configured to introduce the steam into the combustion chamber in a second pattern about the centerline in the second half sector, and the second pattern is different than the first pattern;
the steam delivery circuit including a supply circuit and a plurality of feed circuits, the supply circuit extending from the steam source to an interface of the plurality of feed circuits, each of the plurality of feed circuits extending from the interface to a respective one of the plurality of steam delivery devices.

11. The assembly of claim 10, wherein
the steam system is configured to introduce a first quantity of the steam into the combustion chamber in the first half sector; and
the steam system is configured to introduce a second quantity of the steam into the combustion chamber in the second half sector, and the second quantity of the steam is different than the first quantity of the steam.

12. An assembly for a turbine engine, comprising:
a combustor comprising an annular combustion chamber and a centerline, the annular combustion chamber extending circumferentially around the centerline;
a fuel system configured to inject fuel into the annular combustion chamber for combustion; and
a steam system configured to introduce steam into the annular combustion chamber through at least a plurality of first orifices and a plurality of second orifices, the steam system including a first feed circuit, a second feed circuit and a supply circuit, the first feed circuit in communication with the plurality of first orifices, the second feed circuit in communication with the plurality of second orifices, the supply circuit in parallel fluid communication with the first feed circuit and the second feed circuit, the plurality of first orifices and the plurality of second orifices arranged in a non-repeating pattern circumferentially around the centerline, the steam system configured to introduce the steam into the annular combustion chamber through each of the plurality of first orifices at a first flowrate, and the steam system configured to introduce the steam into the annular combustion chamber through each of the plurality of second orifices at a second flowrate that is different than the first flowrate.

* * * * *